(12) United States Patent
Osicki

(10) Patent No.: US 8,006,891 B2
(45) Date of Patent: Aug. 30, 2011

(54) ROBOT CELL

(75) Inventor: David E. Osicki, Leroy Township, OH (US)

(73) Assignee: Lincoln Global, Inc., City of Industry, CA (US)

( * ) Notice: Subject to any disclaimer, the term of this patent is extended or adjusted under 35 U.S.C. 154(b) by 849 days.

(21) Appl. No.: 11/401,039

(22) Filed: Apr. 10, 2006

(65) Prior Publication Data

US 2007/0235433 A1    Oct. 11, 2007

(51) Int. Cl.
   *B23K 37/00*    (2006.01)

(52) U.S. Cl. ............ 228/49.2; 228/47.1; 228/49.1; 219/125.1

(58) Field of Classification Search ........... 219/125.1, 219/136, 158; 901/142; 228/49.2, 47.1, 228/48, 49.1, 44.5; 269/57, 58
See application file for complete search history.

(56) References Cited

U.S. PATENT DOCUMENTS

| | | | |
|---|---|---|---|
| 2,729,578 A | 1/1956 | Hedlund et al. | |
| 4,369,958 A * | 1/1983 | Maynard | 269/61 |
| 4,958,463 A * | 9/1990 | Hess et al. | 451/178 |
| 5,873,569 A | 2/1999 | Boyd et al. | |
| 6,036,082 A * | 3/2000 | Caldarone | 228/212 |
| 6,264,418 B1 | 7/2001 | Michael et al. | |
| 6,622,906 B1 * | 9/2003 | Kushibe | 228/212 |
| 6,772,932 B1 | 8/2004 | Halstead | |
| 7,238,916 B2 * | 7/2007 | Samodell et al. | 219/125.1 |
| 2002/0030086 A1 * | 3/2002 | Solon et al. | 228/179.1 |
| 2004/0118897 A1 * | 6/2004 | Caldarone et al. | 228/49.1 |

OTHER PUBLICATIONS

International Search Report of PCT/US2007/065365 dated Feb. 8, 2008.

* cited by examiner

*Primary Examiner* — Henry Yuen
*Assistant Examiner* — Jianying Atkisson
(74) *Attorney, Agent, or Firm* — Shannon V. McCue; Louis F. Wagner; Hahn Loeser & Parks LLP

(57) ABSTRACT

A robotic welding cell includes a frame, a robot arm connected to the frame, a welding gun affixed to the robot arm, a welding table connected to the welding frame, and means to move the welding table in or about at least two mutually perpendicular axes. A welding table assembly for use in a robot welding cell is also disclosed.

3 Claims, 6 Drawing Sheets

ROBOT CELL

BACKGROUND OF THE INVENTION

Robots have been used in welding operations for some time. An example of such is disclosed in U.S. Pat. No. 6,772,932, which is incorporated by reference. Typically, a robot arm having a welding torch at a distal end welds a work piece positioned on a work table, which can also be referred to as a welding table. The work table is located in a welding cell and the robot is programmed to weld along a desired path.

In known welding cells, work tables have limited movement with respect to the robot arm. For the robot arm to weld along the desired path, it is the robot arm that moves with respect to the work table, as opposed to the work table being able to move with respect to the robot arm. Greater flexibility with regard to the welding path could be achieved if the work table was able to move.

SUMMARY OF THE INVENTION

A robotic welding cell includes a frame, a robot arm connected to the frame, a welding gun affixed to the robot arm, a welding table connected to the welding frame, and means to move the welding table in or about at least two mutually perpendicular axes. The means to move can comprise a motor operatively connected to the welding table.

A welding table assembly for use in a robotic welding cell is also disclosed. The welding table assembly includes a welding table, a first powered drive assembly operatively connected to the welding table, and a second powered drive assembly operatively connected to the welding table. The first drive assembly rotates the welding table about a first axis. The second drive assembly rotates the welding table about a second axis.

DETAILED DESCRIPTION OF THE INVENTION

Figure 1:
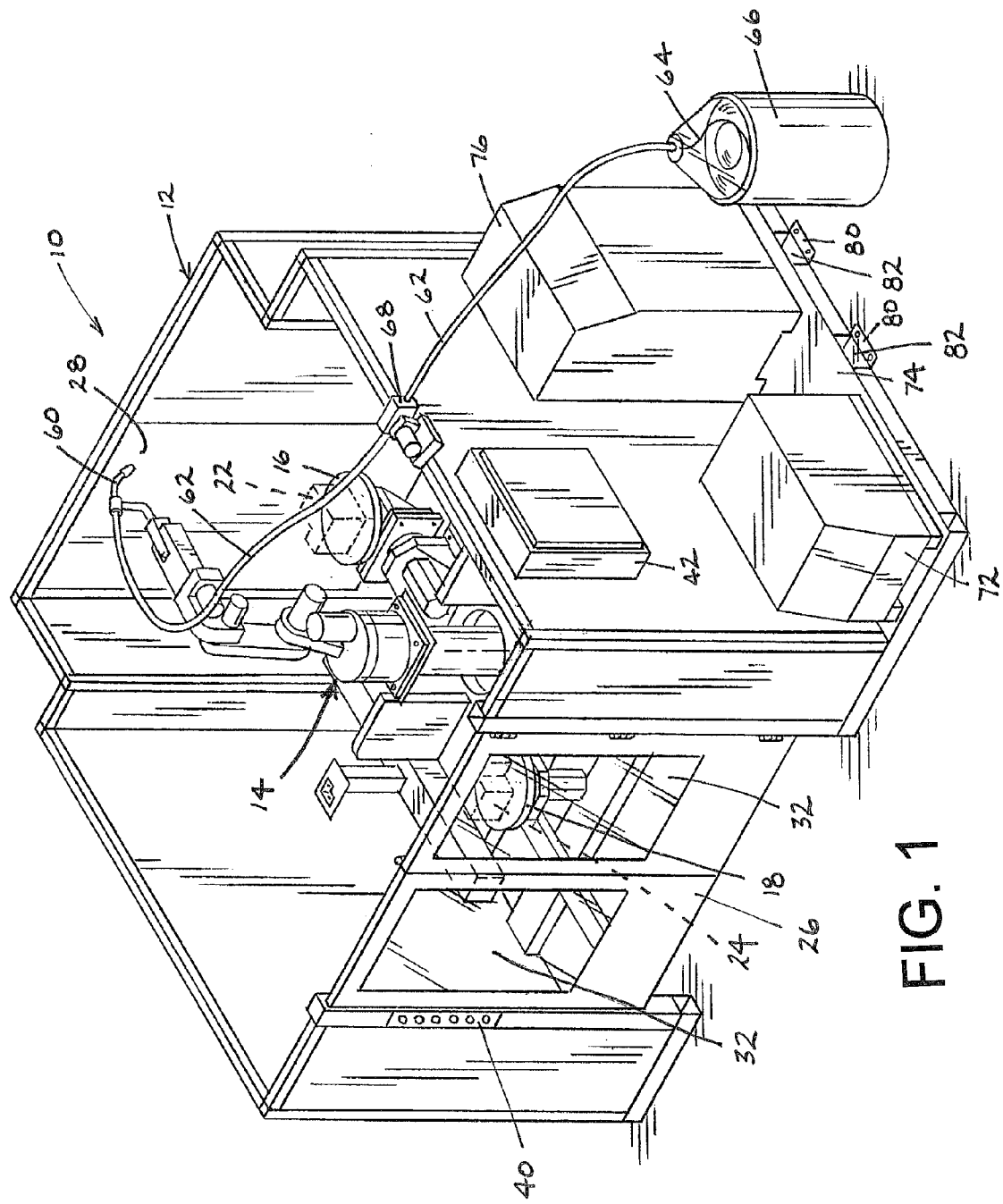
FIG. 1 is a perspective view of a welding cell unit.

With reference to FIG. 1, a welding cell unit 10 generally includes a frame 12, a robot 14 disposed within the frame, and first and second welding tables 16 and 18, respectively, also disposed of within the frame. The robot welding unit 10 is useful for welding work pieces 22 and 24 in a manner that will be described in more detail below.

In the depicted embodiment, the frame 12 includes a plurality of side walls and doors to enclose the robot 14 and the welding tables 16 and 18. Even though a substantially rectangular configuration in plan view is shown, the frame 12, and the unit 10, can take numerous configurations.

A front access door 26 mounts to the frame 12 to provide access to the interior of the frame. As more clearly seen in FIG. 2, the front access door 26 can take a bi-fold configuration where the door includes two hinge sets: a first hinge set attaching the door 26 to the frame 12 and a second hinge set attaching one panel of the door to another panel. Nevertheless, the front access door 26 can take other configurations such as a sliding door or a swinging door. Similarly, a rear access door 28 also mounts to the frame 12. The rear access door 28 in the depicted embodiment also takes a bi-fold configuration; however, the rear access door can take other configurations such as those discussed with reference to the front access door 26. Windows 32 can be provided on either door (only depicted on front door 26). The windows can include a tinted safety screen, which is known in the art.

A control panel 40 is provided on the frame 12 adjacent the front door 26. Control knobs and/or switches provided on the control panel 40 communicate with controls housed in a controls enclosure 42 that is also mounted to the frame 12. The controls on the control panel 40 can be used to control operations performed in the unit 10 in a similar manner to controls used with known welding cell units.

Figure 3:
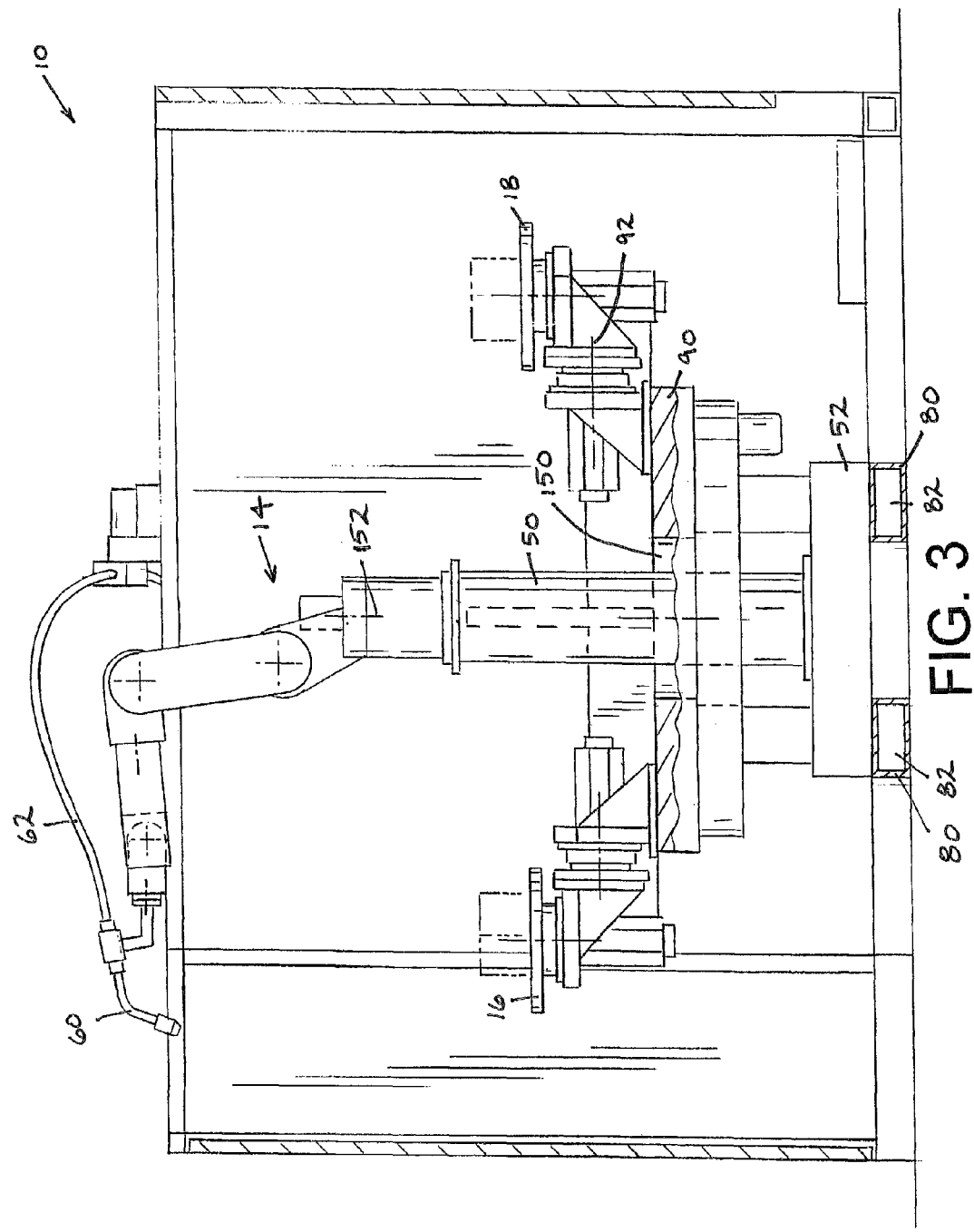
FIG. 3 is a view taken along line 3-3 of FIG. 2.

With reference to FIG. 3, the robot 14 mounts on a pedestal 50 that mounts on a support 52. The robot 14 used in the depicted embodiment can be an ARC MATE® 100iBe robot available from FANUC Robotics America, Inc. Other similar robots can also be used. The robot 14 in the depicted embodiment is centered with respect to the welding tables 16 and 18 and includes eleven axes of movement. If desired, the pedestal 50 can rotate with respect to the support 52 similar to a turret. Accordingly, some sort of drive mechanism, e.g. a motor and transmission (not shown), can be housed in the pedestal 50 and/or the support 52 for rotating the robot 14.

With continued reference to the embodiment depicted in FIG. 3, a welding gun 60 attaches to a distal end of the robot arm 14. The welding gun 60 can be similar to those that are known in the art. A flexible tube or conduit 62 attaches to the welding gun 60. As more clearly seen in FIG. 2, consumable welding electrode wire 64, which can be stored in a container 66, is delivered to the welding gun 60 through the conduit 62. A wire feeder 68, which can be a PF 10 R-II wire feeder available from The Lincoln Electric Company, attaches to the frame 12 to facilitate the delivery of welding wire 64 to the welding gun 60.

Even though the robot 14 is shown mounted to a base or lower portion of the frame 12, if desired, the robot 14 can mount in a similar manner as the robot disclosed in U.S. Pat. No. 6,772,932. That is, the robot can mount to an upper structure of the frame and depend downwardly into the cell unit 10.

With reference back to the embodiment depicted in the figures, a power source 72 for the welding operation mounts to and rests on a platform 74 that is connected to and can be a part of the frame 12. The power source 72 in the depicted embodiment is a PW 455 M (non STT) available from The Lincoln Electric Company; however, other suitable power sources can be used for the welding operation. A robot controller 76, which controls the robot 14, also rests and mounts on the platform 74. The robot controller typically accompanies the robot 14.

Fork lift supports 80 defining fork lift receptacles 82 connect to a lower end of the frame 12. As more clearly seen in FIG. 3, the fork lift supports 80 in the depicted embodiment are centered underneath the robot support 52 and thus the robot 14 to facilitate easy movement of the welding unit 10.

Even though the cell unit 10 is depicted with only two-way forklift access, the unit 10 can be easily modified to include four-way forklift access.

Figure 5:
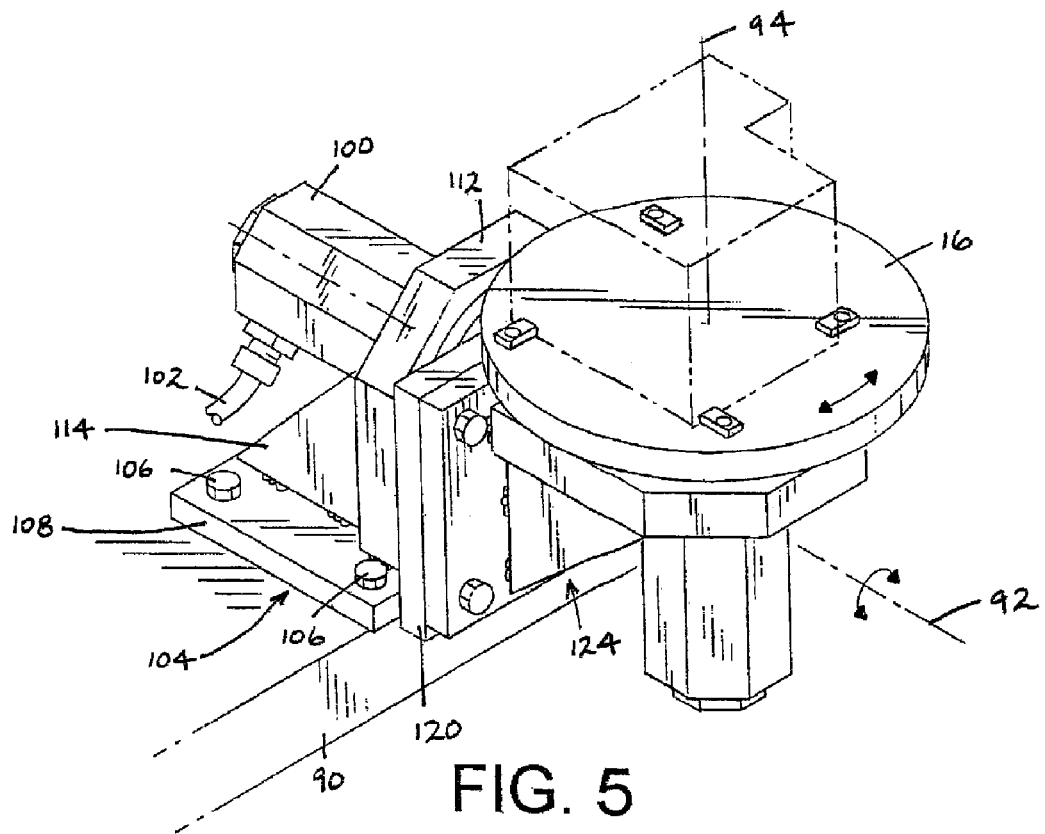
FIG. 5 is a close-up perspective view of a welding table assembly for the unit disclosed in FIG. 1.

With reference to FIG. 5, the connection between the first welding table 16 and a support 90 (also visible in FIG. 2), to which both welding tables 16 and 18 attach, will be described. The connection between the second welding table 18 and the support 90 is the same as the first welding table; therefore, for the sake of brevity only the connection between the first welding table 16 and the support 90 will be described in detail.

The welding table 16 is moveable with respect to the support 90 and with respect to the robot 14. In the embodiment depicted in FIG. 5, the welding table 16 is movable about a first axis 92 and a second axis 94, the first axis being perpendicular to the second axis. The first axis 92 is also parallel to (and in the depicted embodiment spaced above) a plane in which the support 90 resides. The second axis 94 is normal to a plane in which the welding table 16 resides. In the depicted embodiment, the second axis 94 is also spaced from an outermost edge of the support 90. The welding table 16 can move in or about these two axes via motors that will be described in more detail below. Other assemblies and devices can also be provided for moving the welding tables, including pistons for linear movement (in either axis), gearing and transmissions for both linear (e.g. along rails) and rotational movement, as well as other known devices.

Figure 6:
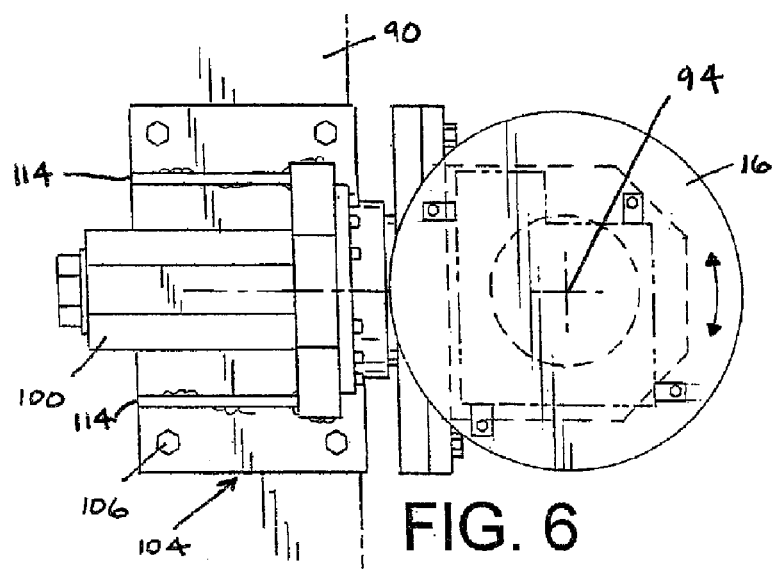
FIG. 6 is a top plan view of the assembly depicted in FIG. 5.
Figure 7:
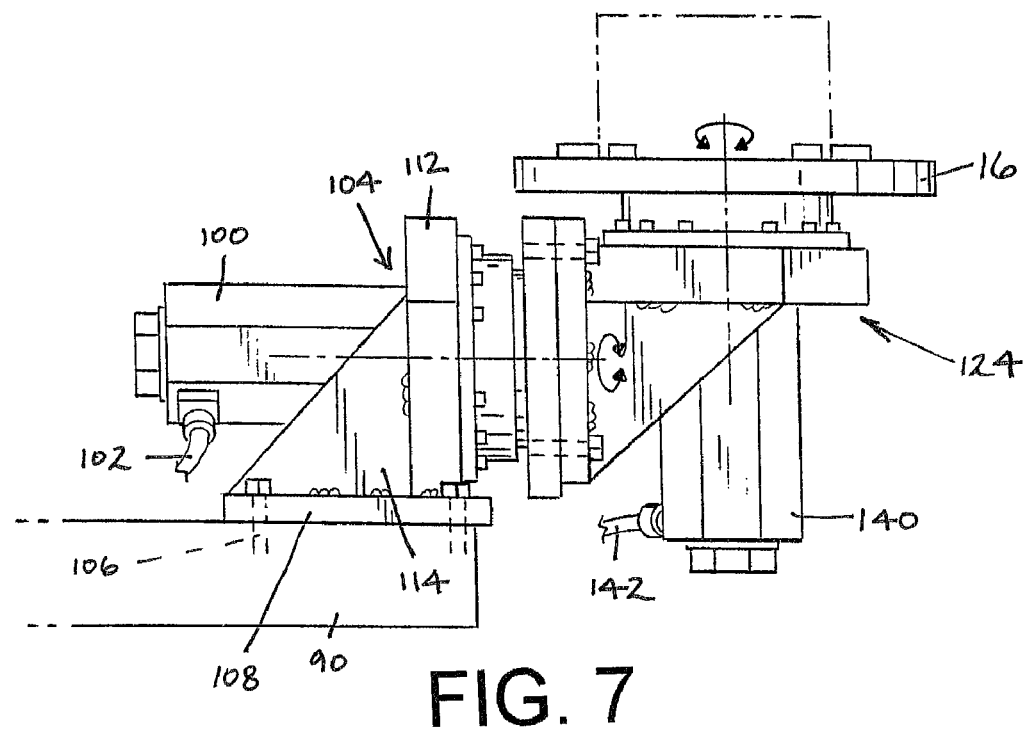
FIG. 7 is a first side elevation view of the assembly depicted in FIG. 5.
Figure 8:
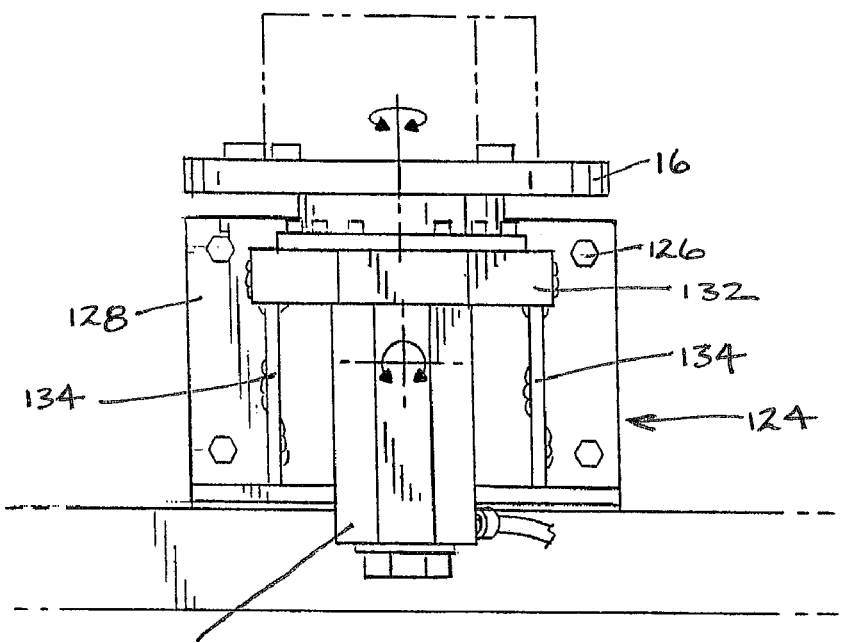
FIG. 8 is a second side elevation view of the assembly depicted in FIG. 5 taken 90° from the view show in FIG. 7.

In the embodiment depicted in FIG. 5-8, a first motor 100 is provided so that the welding table 16 can rotate about the first axis 92. The first motor 100 connects to a power supply (not shown) for the unit 10 via a power cord 102. The first motor 100 mounts to a motor mount 104 and the motor mount connects to the support 90 via bolts 106. In the depicted embodiment, the motor mount 104 includes a base portion 108 and an upright portion 112 that is disposed normally to the base portion. Web portions 114 (two are shown in FIG. 6) are spaced from one another and interconnect the base portion 108 and the support portion 112. The web portions 114 are spaced from one another an adequate distance so that the first motor 100 can be received between the base portions. The support portion 112 of the bracket 104 includes an opening to receive an output shaft (not visible) of the first motor 100. The output shaft of the first motor connects to a support plate 120 such that the support plate can rotate in or about the first axis 92.

A second motor mount 124 that has the same configuration as the first motor mount 104 connects to the support plate 120 so that it can also rotate in or about the first axis 92. As more clearly seen in FIG. 8, the second motor mount 124 attaches to the support plate 120 via bolts (or other conventional fasteners) 126. The second motor mount 124 includes a base portion 128 through which the bolts 126 extend. The second motor mount 124 also includes a support (similar to the upright portion 112 of the first motor mount 124) 132 that extends normally from the base 128. A pair of webs 134 interconnect the support 132 to the base 128. The webs 134 are spaced from one another such that a second motor 140 is receive between the webs 134. The support 132 of the motor mount 124 includes an opening through which an output shaft (not visible) of the second motor 140 is received to operatively connect the second motor 140 to the welding table 16. Power is delivered to the second motor 140 via a power cord 142 that connects to a power source (not shown) for the unit 10.

Accordingly, the welding table 16 rotates about the first axis 92 via the first motor 100 and rotates about the second axis 94 via the second motor 140. As mentioned above, the first axis 92 is parallel to and spaces about a plane in which the support 90 resides. The second axis 94 is spaced from an outer edge of the support 90 as measured along the first axis 92. Movement in the first axis 92 can be limited to prevent damage to the second motor 140 and the welding table 16. The first motor 100 is operatively connected to the welding table 16 via first motor 104 and the second motor mount 124.

As more clearly seen in FIG. 3, the first welding table 16 and the second welding table 18 are spaced from one another and aligned along first axis 92, in that they both reside the same radial distance from the first axis 92. Also, the first and second welding tables 16 and 18 each rotate about an axis that is normal to the axis in which the welding table resides. Even though only two welding tables are depicted, a fewer or greater number of welding tables can be provided.

Figure 4:
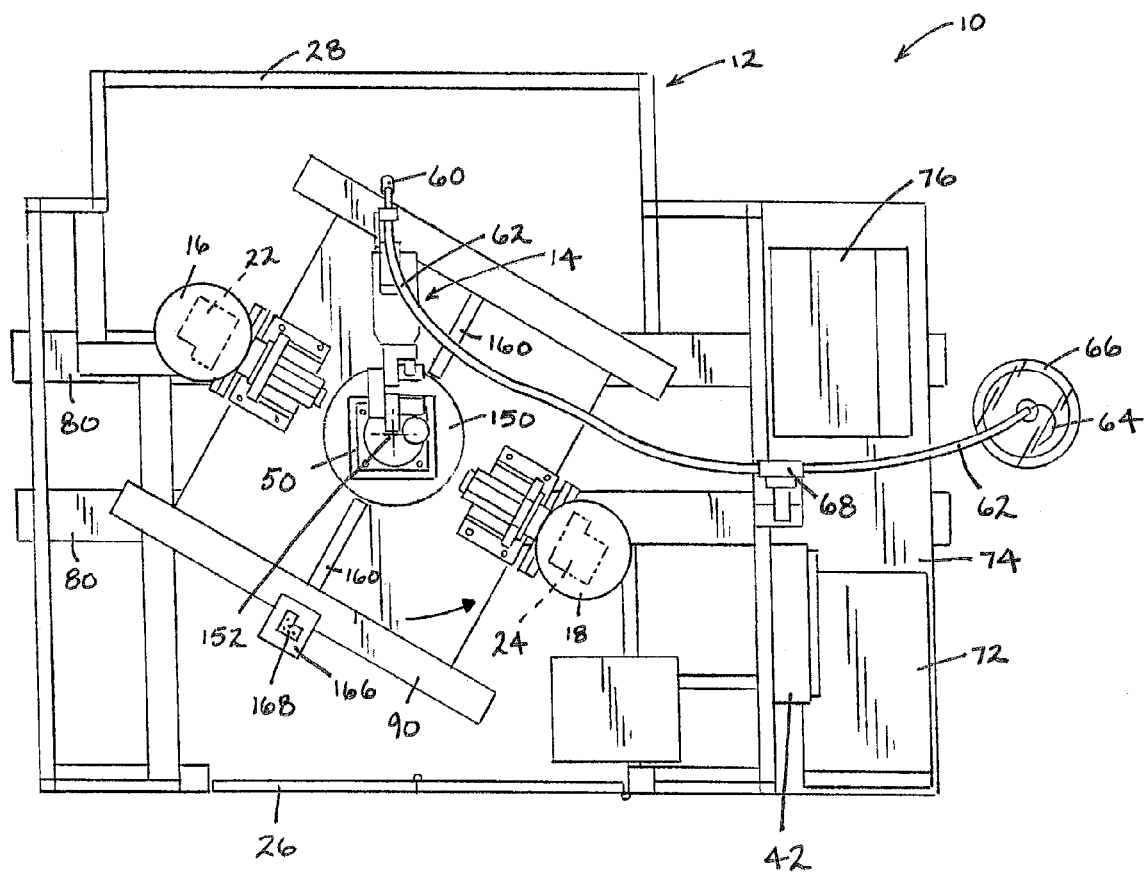
FIG. 4 is a top plan view similar to the view of FIG. 2 where a platform that is disposed in the welding cell unit has rotated from the position shown in FIG. 2.

As discussed above, the first and second welding tables 16 and 18 attach to the support 90. As more clearly seen in FIG. 3 and 4, the support 90 includes a central opening 150 through which the pedestal 50 extends (see FIG. 3). As depicted in FIG. 4, the support 90 rotates about a central axis 152, accordingly, rotation of the support 90 also results in movement of the welding table about at least one axis, i.e. axis 152. In the depicted embodiments the welding tables 16 and 18 are spaced from one another equidistantly from the central axis 152. The robot 152 can also rotate in or about the central axis 152. A seen in FIG. 3, the support 50, which can include or connect to a turret, is also centered on the central axis 152.

Figure 2:
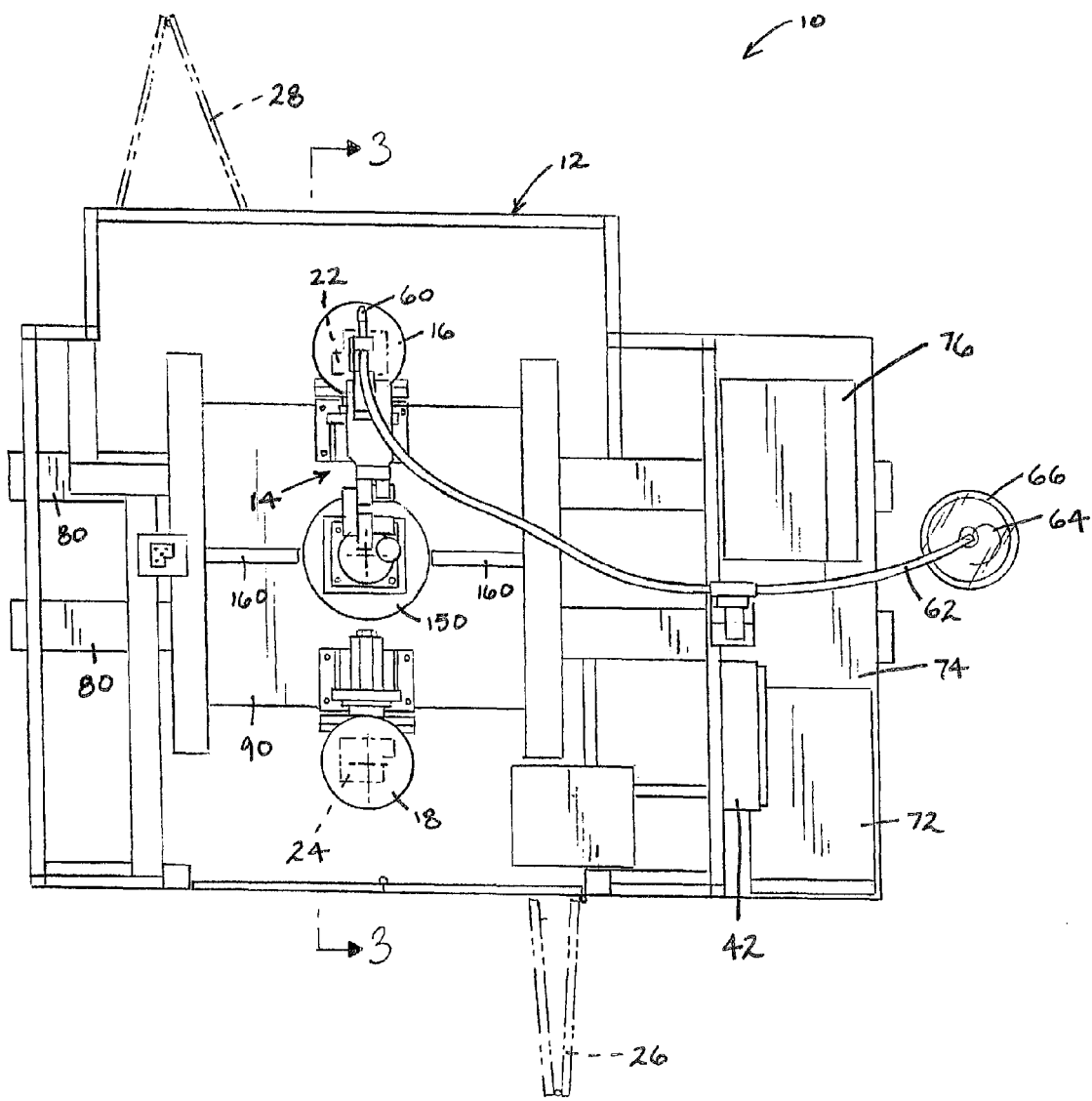
FIG. 2 is a top plan view of the welding cell unit of FIG. 1.

When the unit 10 is in use and with reference to FIG. 2, a part 24 can be loaded onto the second welding table 18 while a welding operation is being performed on the first part 22 located on the first welding table 16. In the depicted embodiment, shields 160 are provided on the support 90 between the respective welding tables on opposite sides of the robot 14. After the welding operation on the first welding table 16 has been completed, the support 90 can rotate in a manner such that the second welding table 18 now occupies the location or space that the first welding table 16 had occupied. The welding operation can then be performed on the second piece 24. The process can then be repeated.

A receptacle 168 for receiving torch conditioning devices, such as a reamer, is provided on the support 90 for cleaning of the welding gun 60 between welding procedures. A touch probe (not depicted) can also be provided on the frame and/or the support 90. The touch probes serves as a tool point reference. The touch probe can be used on a datum to allow for reprogramming of the robot. Such torch conditioning and touch probe devices are known in the art.

A welding cell unit and a welding table assembly have been described with reference to the above-mentioned embodiments and alternatives thereof. Many modifications and alterations to those embodiments disclosed readily suggest themselves to those skilled in the art upon reading and understanding the detailed description. For example, the welding table assembly can be used with other configurations of welding cell units, for example, the welding cell unit described in co-pending application Ser. No. 10/992,890, filed on Nov. 19, 2004, which is incorporated by reference herein. The invention is intended to include all such modifications and alterations insofar as they come within the scope of the appended claims and the equivalents thereof.

The invention claimed is:

1. A welding table assembly for use in a robot welding cell, the assembly comprising:
   a welding table;
   a first powered drive assembly operatively connected to the welding table, wherein the first drive assembly rotates the welding table about a first axis; said first powered drive assembly being supported on a first support, said first support defining a first opening for receiving an output shaft of said first powered drive assembly, said first support being rotatable about a third axis perpendicular to said first axis;

a second powered drive assembly including an output shaft operatively connected to the welding table, wherein the second powered drive assembly rotates the welding table about a second axis that is perpendicular to the first axis;

a second support extending from a base, said base being operatively connected to said first powered drive assembly, said second support extending in a plane parallel to and spaced from said first axis, wherein said second support and said base rotate about the first axis, said second support defining a second opening;

wherein the second powered drive assembly is supported beneath the second support with said output shaft of the second powered drive assembly extending through the second opening in the second support such that the output shaft of the second powered drive assembly and the welding table freely rotate with respect to the second support.

2. The assembly of claim 1, wherein the second powered drive assembly is configured to prevent a complete revolution of the welding table about the first axis.

3. The assembly of claim 1, wherein the first powered drive assembly is configured to allow a complete revolution of the welding table about the second axis.

* * * * *